US008629821B2

(12) United States Patent
Borgers et al.

(10) Patent No.: US 8,629,821 B2
(45) Date of Patent: Jan. 14, 2014

(54) DISPLAY DEVICE WITH FASTER CHANGING SIDE IMAGE

(75) Inventors: Charlotte Wendy Michele Borgers, West Sussex (GB); Benjamin John Broughton, Abingdon (GB); Kenji Maeda, Osaka (JP); Tatsuo Watanabe, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 308 days.

(21) Appl. No.: 13/229,858

(22) Filed: Sep. 12, 2011

(65) Prior Publication Data

US 2013/0063457 A1 Mar. 14, 2013

(51) Int. Cl.
*G09G 3/00* (2006.01)
*G09G 5/00* (2006.01)
*G06F 3/038* (2013.01)

(52) U.S. Cl.
USPC .................. 345/87; 345/204; 349/74; 349/86

(58) Field of Classification Search
USPC ................................ 345/87, 204; 349/74, 86
See application file for complete search history.

(56) References Cited

U.S. PATENT DOCUMENTS

RE27,617 E 4/1973 Olsen
4,764,410 A 8/1988 Grzywinski
4,766,023 A 8/1988 Lu
7,453,429 B2 * 11/2008 Chang et al. .................... 345/89
2004/0239698 A1 * 12/2004 Kamada et al. ............... 345/714
2007/0040780 A1 2/2007 Gass et al.
2008/0158119 A1 * 7/2008 Park et al. ....................... 345/87

FOREIGN PATENT DOCUMENTS

GB 2 413 394 A 10/2005
GB 2 428 152 A 1/2007
GB 2 439 961 A 1/2008
GB 2 455 061 A 6/2009
WO 2006/132384 A1 12/2006
WO 2009/110128 A1 9/2009
WO 2011/034208 A1 3/2011
WO 2011/034209 A1 3/2011

OTHER PUBLICATIONS

R. McCartney, “A Liquid Crystal Display Response Time Compensation Feature Integrated into an LCD Panel Timing Controller”, SID ’03 Digest, pp. 1350-1353 (2003).

* cited by examiner

*Primary Examiner* — Kevin M Nguyen
(74) *Attorney, Agent, or Firm* — Renner, Otto, Boisselle & Sklar, LLP

(57) ABSTRACT

A display device is provided which includes a liquid crystal display panel including a plurality of pixels each having one or more sub-pixels; and control electronics configured to provide, in response to image data, signal voltages to the pixels in a first mode whereby an on-axis viewer and an off-axis viewer perceive substantially a same main image, and signal voltages to the pixels in a second mode whereby the on-axis viewer perceives the main image and the off-axis viewer perceives a side image different from the main image.

13 Claims, 12 Drawing Sheets

Figure 8

| Initial side \ Final side | 0 | 1 | 2 | 3 |
|---|---|---|---|---|
| 0 | | No compensation value required | No compensation value required | Side 0+ → **side 0+** → side 3+<br>Side 0- → side 3- → side 3- |
| 1 | No compensation value required | | No compensation value required | Side 1+ → **side1+** → side 3+<br>Side 1- → side 3- → side 3- |
| 2 | No compensation value required | No compensation value required | | No compensation value required |
| 3 | Side 3+ → side 0+ → side 0+<br>Side 3- → **new column** → side 0- | No compensation value required | No compensation value required | |

DISPLAY DEVICE WITH FASTER CHANGING SIDE IMAGE

TECHNICAL FIELD

The present invention relates to a display device, such as an active matrix liquid crystal display device, which is switchable between a public and private display mode.

BACKGROUND ART

A viewing angle adjustable display may have two viewing modes, a public mode and a private mode. In the public mode the device commonly behaves as a standard display. A single image is displayed by the device to as wide a viewing angle range as possible, with optimum brightness, image contrast and resolution for all viewers. In the private (or privacy) mode, the main image is discernable only from within a reduced range of viewing angles, usually centred normally to the display. Viewers observing the display from outside the reduced angular range will perceive either a masking, side image which obscures the main image, or a main image so degraded as to render it unintelligible.

Several types of viewing angle adjustable displays, with varying degrees of additional cost over a standard display, ease of use and strength of privacy performance are well known.

Devices incorporating such viewing angle adjustable displays include mobile phones, eBook readers, Personal Digital Assistants (referred to herein as PDAs), laptop computers, desktop monitors, Automatic Teller Machines (referred to herein as ATMs) and Electronic Point of Sale (referred to herein as EPOS) equipment. Viewing angle adjustable displays can also be beneficial in situations where it is distracting, and therefore unsafe, for certain viewers to observe certain images at certain times. For example an in car television screen should not be observed by a driver whilst the car is in motion.

Several methods exist for adding a light controlling apparatus to a display with a naturally wide viewing angle. One such light controlling apparatus is the microlouvre film described in U.S. RE27617 (Olsen; Aug. 15, 1967), U.S. Pat. No. 4,766,023 (Lu; Aug. 23, 1988) and U.S. Pat. No. 4,764,410 (Grzywinski; Aug. 16, 1988). This and other methods involving detachable optical arrangements are not conveniently switchable as changing the display between the private and public modes requires manual placement and removal of the film or other apparatus.

Methods of providing an electronically switchable viewing angle adjustable display are disclosed in GB2413394 (Winlow et al.; Oct. 26, 2005), WO06132384A1 (Kean et al.; Dec. 14, 2006) and GB2439961 (Smith et al.; Jan. 16, 2008). These inventions describe switchable privacy devices constructed by adding one or more extra liquid crystal layers and polarisers to a display panel. The intrinsic viewing angle dependence of these extra elements can be changed by switching the liquid crystal electrically in a known way. Devices utilising this technology include the commercially-available Sharp Sh851i and Sh902i mobile phones. These methods share the disadvantages that the additional optical components add thickness and cost to the display.

Methods to control the viewing angle properties of a liquid crystal display (referred to herein as LCD) by switching the single liquid crystal layer of the display between two different configurations, both of which are capable of displaying a high quality image to the on-axis viewer are described in US20070040780A1 (Gass et al., Feb. 22, 2007) and GB2455061 (Broughton et al.; Jun. 3, 2009). These devices have the advantage that they provide the switchable privacy function without the need for added display thickness, but have the disadvantage that they require complex pixel electrode designs and other manufacturing modifications compared to a standard display.

One example of a display device with privacy mode capability with no added display hardware complexity is the commercially-available Sharp Sh702iS mobile phone. This uses image data manipulation in conjunction with the angular data-luminance properties inherent to the liquid crystal mode used in the display, to produce a private mode in which the displayed information is unintelligible to viewers observing the display from an off-axis position. A key advantage of this type of method is that in the public mode, the display consists of, and operates as, a standard display, with no image quality degradation causes by the private mode capability. However, when in the private mode, the quality of the image displayed to the legitimate, on-axis viewer is reduced.

GB2428152A1 (Wynne-Powell et al.; Jan. 17, 2007), WO2011034209 (Broughton et al.; Mar. 24, 2011) and WO2011034208 (Broughton et al.; Mar. 24, 2011) disclose improved schemes where the image data is manipulated in a manner dependent on a second, side image. Consequently, in the private mode, an on axis viewer observes the main image whilst an off-axis viewer observes the side image. These methods provide an electronically switchable public/private display with no additional optical elements required, minimal cost and satisfactory privacy performance. However these methods can suffer from a distracting on-axis flash artefact when the side image changes significantly and suddenly from one frame to the next.

WO2009110128A1 (Broughton et al.; Sep. 11, 2009) discloses a method that solves the on-axis flash artefact problem by graduating the transition of the side image from dark to bright or vice versa. Inserting two image frames with intermediate side image luminance values between the bright and dark side image states, minimises the effect of the flash to the on-axis observer. However inserting two intermediate frames reduces the possible video frame rate of the side image which is undesirable.

It is therefore desirable to provide a high quality LCD display which has public and private mode capability, in which no modifications to the LC layer or pixel electrode geometry is required from a standard display, has a substantially unaltered display performance (brightness, contrast ratio, resolution, etc.) in the public mode and, in the private mode has a strong privacy effect with minimal degradation to the on-axis image quality, particularly for a changing side image.

SUMMARY OF INVENTION

According to an aspect of the invention, a display device is provided which includes a liquid crystal display panel including a plurality of pixels each having one or more sub-pixels; and control electronics configured to provide, in response to image data, signal voltages to the pixels in a first mode whereby an on-axis viewer and an off-axis viewer perceive substantially a same main image, and signal voltages to the pixels in a second mode whereby the on-axis viewer perceives the main image and the off-axis viewer perceives a side image different from the main image. The first mode the signal voltages provided to the pixels result in a luminance among a group of the sub-pixels, and in the second mode the signal voltages provided to the pixels result in the luminance redistributed among the group of sub-pixels, an average luminance among the group of sub-pixels in the second mode being substantially proportional to an average luminance among the group of sub-pixels in the first mode with respect to the on-axis viewer, regardless of a degree of redistribution, and substantially varying with the degree of redistribution with respect to the off-axis viewer. The control electronics is further configured to compensate for a temporal change in the average luminance among the sub-pixel pairs in the second mode due to a difference in electro-optical response of the sub-pixels within the group of sub-pixels as a result of a change in the degree of luminance redistribution, by adding a compensation value to the signal voltages to underdrive or overdrive one or more of the sub-pixels within the group of sub-pixels.

According to another aspect, the signal voltages provided to the pixels in the second mode are based on main image data and side image data received by the control electronics, the degree of luminance redistribution is a function of the side image data, and the compensation value is provided in response to a change in value of the side image data.

In accordance with another aspect, the compensation value is predetermined to avoid a visible on-axis flash.

According to another aspect, the control electronics is configured to add the compensation value to the signal voltages in response to some predefined changes in value of the side image data and not in response to other predefined changes in value of the side image data.

According to yet another aspect, as a result of the change in degree of the luminance redistribution a first one of the sub-pixels in the group of sub-pixels has a relatively fast electro-optical response and a second one of the sub-pixels in the group of sub-pixels has a relatively slow electro-optical response, and wherein the control electronics provides the compensation value to slow the electro-optical response of the first one of the sub-pixels and/or speed up the electro-optical response of the second one of the sub-pixels.

In accordance with still another aspect, the side image is a mask to obscure and/or degrade the main image.

According to another aspect, the control electronics in the second mode maps data values of the main image data and side image data to a single signal voltage per pixel, and when the control electronics determines a change in a current side image data value compared to a previous side image data value the control electronics adds the compensation value to the signal voltage.

In accordance with yet another aspect, the control electronics includes at least one look-up table for mapping the data values of the main image data and the side image data, the at least one look-up table including compensation values corresponding to different changes in the current side image data value and previous side image data value.

According to another aspect, the control electronics being further configured to avoid providing compensation values to a sub-pixel in consecutive frames.

In accordance with another aspect, the side image data is stored in a side image data random access memory (RAM) included in the control electronics.

According to another aspect, the RAM stores the side image data pixel-by-pixel, and the control electronics reads the side image data for a given pixel from the RAM one side image at a time.

According to yet another aspect, the side image data is stored in the RAM in groups of several pixels, and the control electronics reads the side image data for multiple pixels of a given side image from the RAM at a time.

In still another aspect, the side image data is stored in the RAM in groups of several pixels, and the control electronics reads the side image data for a given pixel for multiple side images from the RAM at a time.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 8: is a table showing which side image switches may require compensation in accordance with an embodiment of the invention.

DESCRIPTION OF REFERENCE NUMERALS

Figure 1:
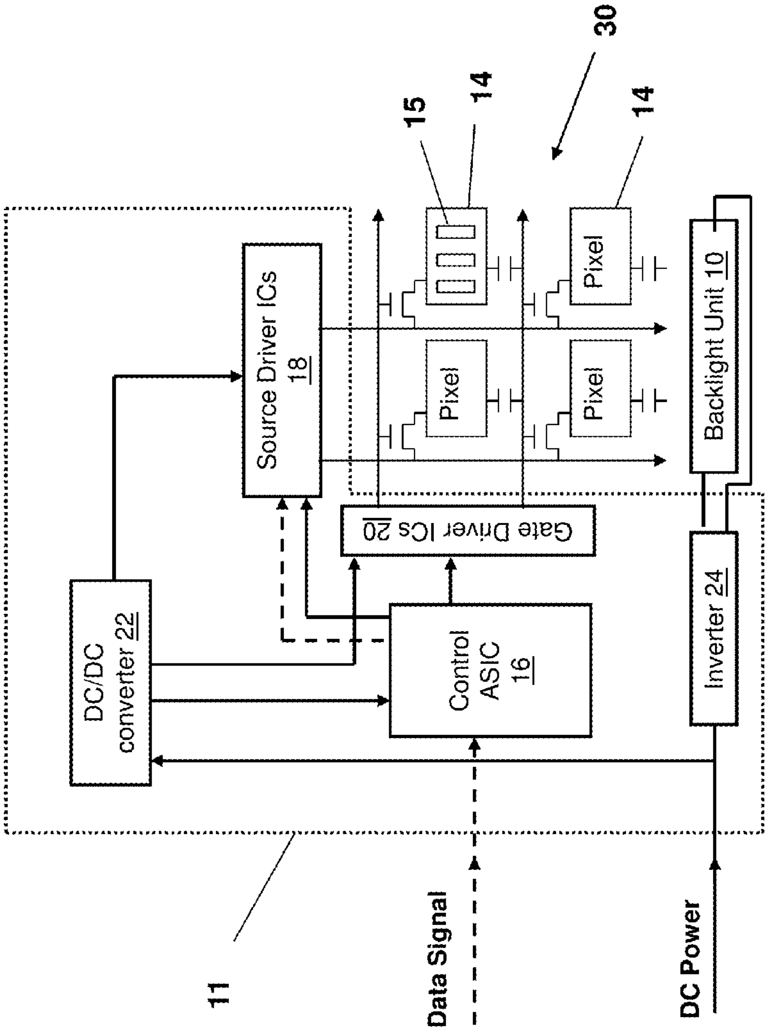
FIG. 1: is an example schematic of an LCD display panel and associated control electronics according to an embodiment of the present invention.

10 backlight unit
11 control electronics
14 pixel
15 sub-pixel
16 control ASIC
18 source driver ICs

20 gate driver ICs
22 DC/DC converter
34 inverter
30 LC panel
33 on-axis viewer
34 wide viewing region
36 narrow viewing region
37 off-axis viewer
50 main image data
54 side image data
56 change in luminance as a function of time from a higher luminance value than that specified by the main image to the luminance value specified by the main image
58 change in luminance as a function of time from a lower luminance value than that specified by the main image to the luminance value specified by the main image
60 average change in luminance as a function of time
64 frame buffer
66 write frame check
67 side image RAM
68 read frame check

DETAILED DESCRIPTION OF INVENTION

In an embodiment of the present invention, the display includes a standard, single mode, wide-viewing LCD with modified LCD control electronics (referred to herein as control electronics) as represented in FIG. 1. The LCD is generally made up of several component parts including:

1. A backlight unit 10 to supply even, wide angle illumination to the panel.

2. Control electronics 11 to receive digital image data and output analogue signal voltages for each pixel 14, as well as timing pulses and a common voltage for the counter electrode of all pixels 14. Each pixel 14 includes one or more sub-pixels 15. Digital image data is received via a data signal and is input to a controller typically in the form of a control application specific integrated circuit (ASIC) 16. The control ASIC 16 in turn controls the source driver integrated circuits (ICs) 18 and gate driver ICs 20 to provide corresponding signal data voltages and gate control signals to the pixels 14. A DC/DC converter 22 creates the appropriate DC voltage levels within the control electronics 11, and an inverter 24 provides the power to drive the backlight unit 10. For sake of brevity, the description provided herein is directed primarily only to the relevant differences between the present invention and a standard single mode, wide-viewing LCD, and specifically the modified control electronics 11 of the present invention compared with standard LCD control electronics. A more detailed discussion of the standard aspects of the control electronics 11 may be found, for example, in Ernst Lueder, *Liquid Crystal Displays*, Wiley and Sons Ltd, 2001. A liquid crystal (referred to herein as LC) panel 30, for displaying an image by spatial light modulation, consisting of a two opposing glass substrates, onto one of which is disposed an array of pixel electrodes and active matrix array to direct the electronic signals, received from the control electronics 11, to the pixel electrodes. Onto the other substrate is usually disposed a uniform common electrode and colour filter array film. Between the glass substrates is contained an LC layer of given thickness, usually 2-6 μm, which may be aligned by the presence of an alignment layer on the inner surfaces of the glass substrates. The glass substrates will generally be placed between crossed polarising films and other optical compensation films to cause the electrically induced alignment changes within each pixel region of the LC layer to produce the desired optical modulation of light from the backlight unit and ambient surroundings, and thereby generate the image.

Figure 2:
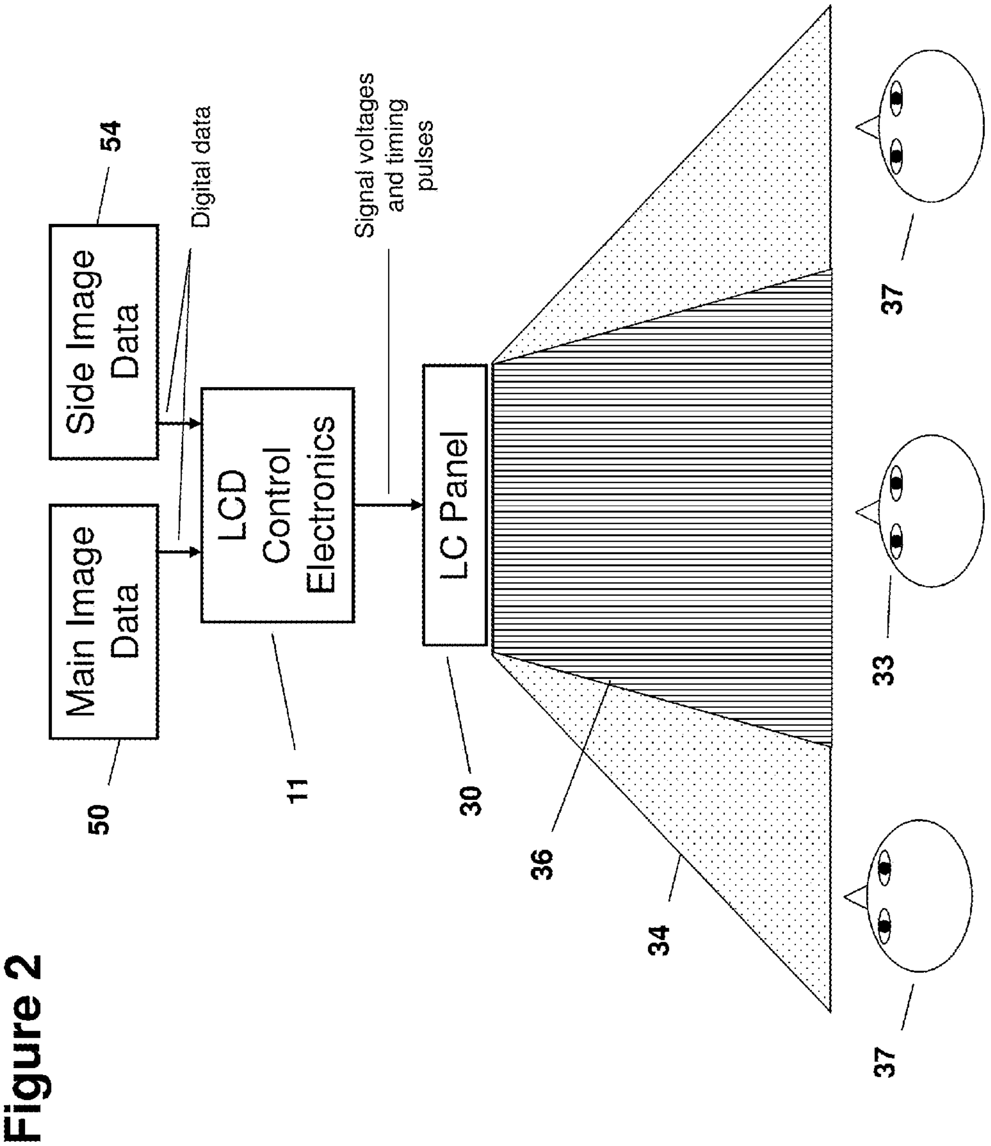
FIG. 2: is a schematic representation of the switchable public/private viewing mode, according to an embodiment of the present invention.

The switchable public/private viewing mode operation according to the present invention is represented schematically in FIG. 2. Generally the control electronics 11 will be configured specifically to the electro-optical characteristics of the LC panel 30, so as to output signal voltages which are dependent on the input image data in such a way as to optimise the perceived quality of the displayed image (i.e. resolution, contrast, brightness, response time etc.) for the principal viewer 33, observing from a on-axis direction, normal to the display surface (LC panel 30). The gamma curve, which gives the relationship between the input image data value for a given pixel and the observed luminance resulting from the display, is determined by the combined effect of the data value to signal voltage mapping of the display drivers 18, 20, and the signal voltage to luminance response of the LC panel 30.

The LC panel 30 will generally be configured with multiple LC domains per sub-pixel and/or passive optical compensation films so as to preserve the display gamma curve as closely as possible to the on-axis response for all viewing angles, thereby providing substantially the same high quality image to a wide angular viewing region 34 as a narrower, main angular viewing region 36. However, it is an inherent property of LCDs that their electro-optic response is angularly dependent and the off-axis gamma curve will inevitably differ from the on-axis gamma curve. As long as this does not result in contrast inversion or large colour-shift or contrast reduction, this does not generally result in an obvious perceived fault in the observed image for the off-axis viewer 35.

When the display device of this embodiment is operating in the public mode (first mode), a set of main image data 50, constituting a single image, is input to the control electronics 11, in each frame period. The control electronics 11 then outputs a set of signal data voltages to the LC panel 30. Each of these signal voltages is directed by the active matrix array of the LC panel 30 to the corresponding pixel electrode and the resulting collective electro-optical response of the pixels 14 in the LC layer generates the image. Substantially the same main image is then perceived by the on-axis viewer 33, and off-axis viewers 37, and the display can be said to be operating in a wide viewing, public mode.

When the device of this embodiment is operating in the private mode (second mode), a set of main image data 50, and a set of masking, side image data 54, are input to the control electronics 11 in each frame period. The control electronics 11 then outputs a set of modified signal data voltages to the LC panel 30. The set of modified signal data voltages are stored within the control electronics 11 in look-up tables (referred to herein as LUTs), one for each coloured sub-pixel. Each of the LUTs include a number of columns, each with as many rows as there are input data levels, for example 256 in an 8 bit per colour display. If desired the LUTs may be combined into a single, expanded LUT with a greater number of columns. Within each LUT, which output value is selected may be dependent on a modification pattern based on the position of the pixel or sub-pixel being modified in the image to be displayed. For example, pixels or sub-pixels with a row and column position which are both odd or both even on the display may be modified to take particular output values in the LUT, while pixels or sub-pixels with a row and column position in the image which are odd and even, or even and odd, respectively, may be modified to take different output values in the LUT to those pixels or sub-pixels with a row and a column position which are both odd or both eve on the display.

In this way, otherwise standard control electronics 11 is modified to receive, and store in a buffer, two (i.e., main image data 50 and different side image data 54), rather than one, images per frame period, and also to map the data values of two input images to a single output voltage per pixel 14, possibly also taking into account a third, position dependent parameter into this mapping. In this case the mapping of input image data to output pixel voltage is no longer identical for all pixels, or even all sub-pixels of the same colour component, in the display.

The output voltage from the control electronics 11 then causes the LC panel 30 to display a combined image which is the main image when observed within the main viewing region 36 by the main viewer 33 with minimal degradation of the main image quality. However, due to the different gamma curve characteristic of the LC panel 30 for the off-axis viewers 37, the side image is perceived most prominently, which obscures and/or degrades the main image, securing the main image information to on-axis viewers 33 within a restricted cone of angles centred on the display normal, i.e., within the main viewing region 36.

Figure 3:
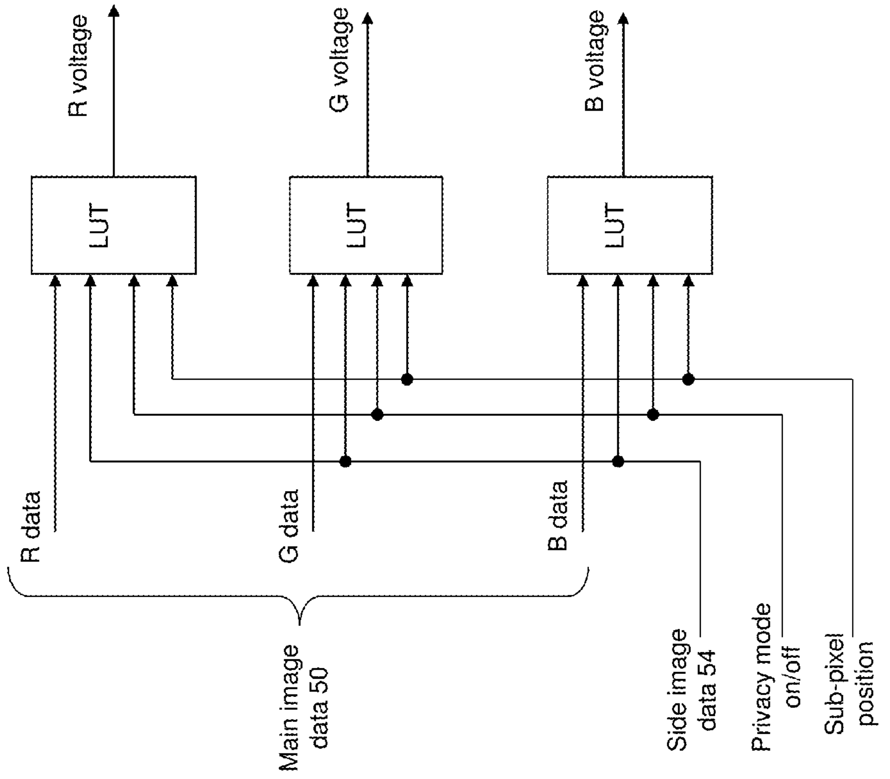
FIG. 3: is a schematic illustrating how a portion of the control electronics may be implemented in an electronic circuit.

FIG. 3 is a schematic illustrating how the LUTs within the control electronics 11 could be implemented. As can be seen, an R,G,B output voltage is supplied for all combinations of main image data pixel values, side image data pixel values, privacy mode on/off and the sub-pixel position. The whole of the LUTs are not shown, as the main image data 50 will typically have 8 bit data, so 256 possible values, for each of which there are 17 possible combinations of the above parameters for a 2 bit data side image (if privacy mode is off, there is no need to refer to the side image and sub-pixel position parameters). It should be noted that the embodiment is not limited to 2 bit data for the side image and that main and side images of any colour bit depth can be accommodated by the device, changes to which simply change the amount of additional memory required.

The modifications to the control electronics 11 achieve this privacy effect by altering the brightness so as to redistribute the luminance among sub-pixels within groups of two or more sub-pixels of the same colour type from that specified by the main image data 50. Specifically, while the group of sub-pixels maintain an average luminance the same or proportional to the overall or average luminance as specified by the main image data 50 as observed by the on-axis viewer 33, the distribution of luminance within the group is changed to a greater or lesser extent. For example, two sub-pixels of 50% luminance as specified by the main image data may have their luminance altered, or redistributed, in equal and opposite directions, so they maintain the same average luminance to the on-axis viewer 33, but their average luminance to the off-axis viewer 37 changes as the degree of luminance redistribution is increased.

Thus, the control electronics 11 is configured to provide, in response to the image data, signal voltages to the pixels in the public mode whereby the on-axis viewer 33 and the off-axis viewer 37 perceive substantially the same main image, and signal voltages to the pixels in the privacy mode whereby the on-axis viewer 33 perceives the main image and the off-axis viewer 37 perceives the side image which different from the main image. In the public mode the signal voltages provided to the pixels result in a luminance among a group of the sub-pixels, and in the privacy mode the signal voltages provided to the pixels result in the luminance redistributed among the group of sub-pixels. An average luminance among the group of sub-pixels in the privacy mode is substantially proportional to an average luminance among the group of sub-pixels in the public mode with respect to the on-axis viewer 33, regardless of a degree of redistribution, and substantially varying with the degree of redistribution with respect to the off-axis viewer 37.

Each group of two or more sub-pixels is made up preferably of one sub-pixel colour from one pixel and one sub-pixel colour from an adjacent pixel or pixels of the same row or column within the display. The sub-pixels in a given group do not necessarily have to be immediately adjacent one another, but rather could be diagonally opposed or otherwise. The main criteria is that the pixels containing the sub-pixels belonging to the given group are close enough so that the eye of the viewer tends to blur the pixels together and sees the same image on-axis compared to the original image.

Figure 4:
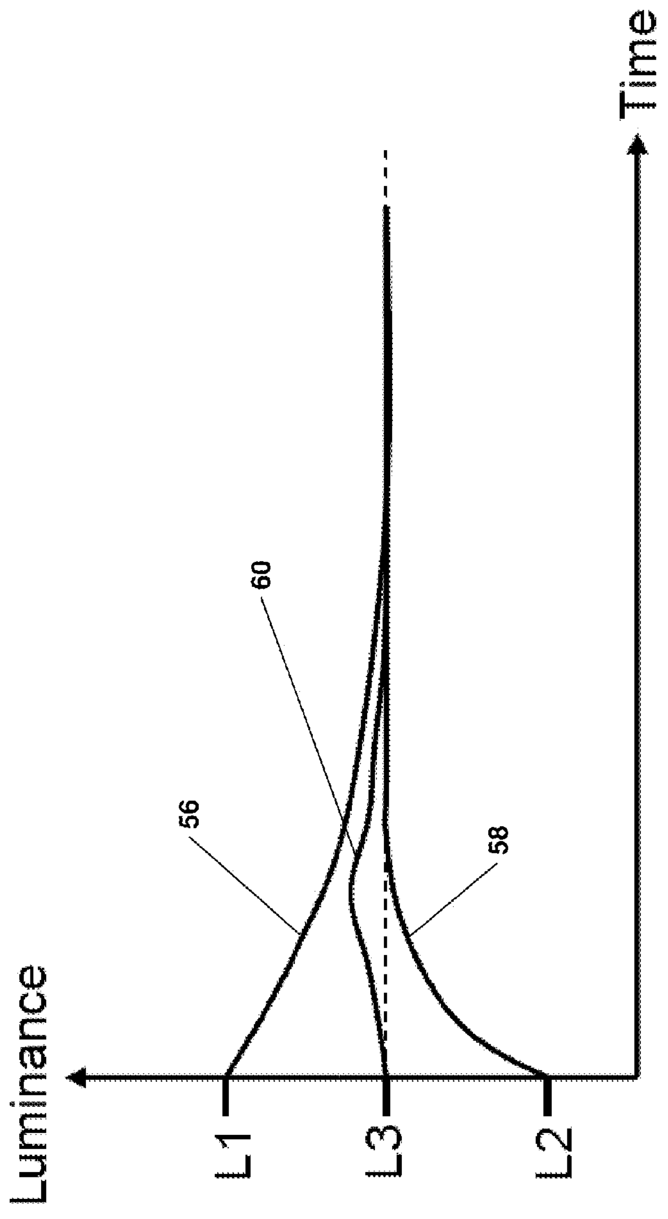
FIG. 4: is a graph showing the change in luminance as a function of time for a sub-pixel changing from a higher luminance value than that specified by the main image to the luminance value specified by the main image, for a sub-pixel changing from a lower luminance value than that specified by the main image to the luminance value specified by the main image, and the resulting average change in luminance as a function of time.

When the side image data 54 changes, the degree of luminance redistribution, in groups of two or more sub-pixels of the same colour type, may change. For example, the sub-pixels of the same colour type of the group may change from having some large degree of luminance redistribution to having no luminance redistribution as illustrated in FIG. 4. Consequently, half the sub-pixels in a given group for a given frame may change or switch from a higher luminance value than that specified by the main image, L1, to the luminance value specified by the main image, L3, and the other half of the sub-pixels within the group may change or switch within the same frame from a lower luminance value than that specified by the main image, L2, to the luminance value specified by the main image, L3. The electro-optical response of the liquid crystal (i.e. the change in luminance as a function of time) of the two different switches in luminance, 56 and 58, may not be exactly opposite to one another. Consequently, there is conventionally a temporal change in their average luminance, 60, which may be observed as an on-axis flash artefact.

The invention so far described, amounts to the methods for producing a switchable privacy mode disclosed in GB2428152A1, WO2009110128A1, WO2011034209 and WO2011034208, discussed above. The remainder of this disclosure will concentrate on the optimal means of solving the on-axis flash artefact that can occur when the side image changes.

It is possible to reduce or eliminate the on-axis flash artefact by reducing or eliminating the temporal change in the average brightness, 60, of the two different changes in luminance, 56 and 58. To reduce or eliminate the temporal change in the average brightness it is desirable to match the LC electro-optical responses of the two different switches. It is possible to use an overdriving method to speed up the slower change in luminance 56, and/or it is possible to use an underdriving method to slow down the faster change in luminance 58. Overdriving and underdriving schemes, also known as response time compensation (referred to herein as RTC), as applied to LCDs, are well known (McCartney, R., "A Liquid Crystal Display Response Time Compensation Feature Integrated into an LCD Panel Timing Controller", SID '03 Digest, pp 1350-1353 (2003)).

Figure 5:
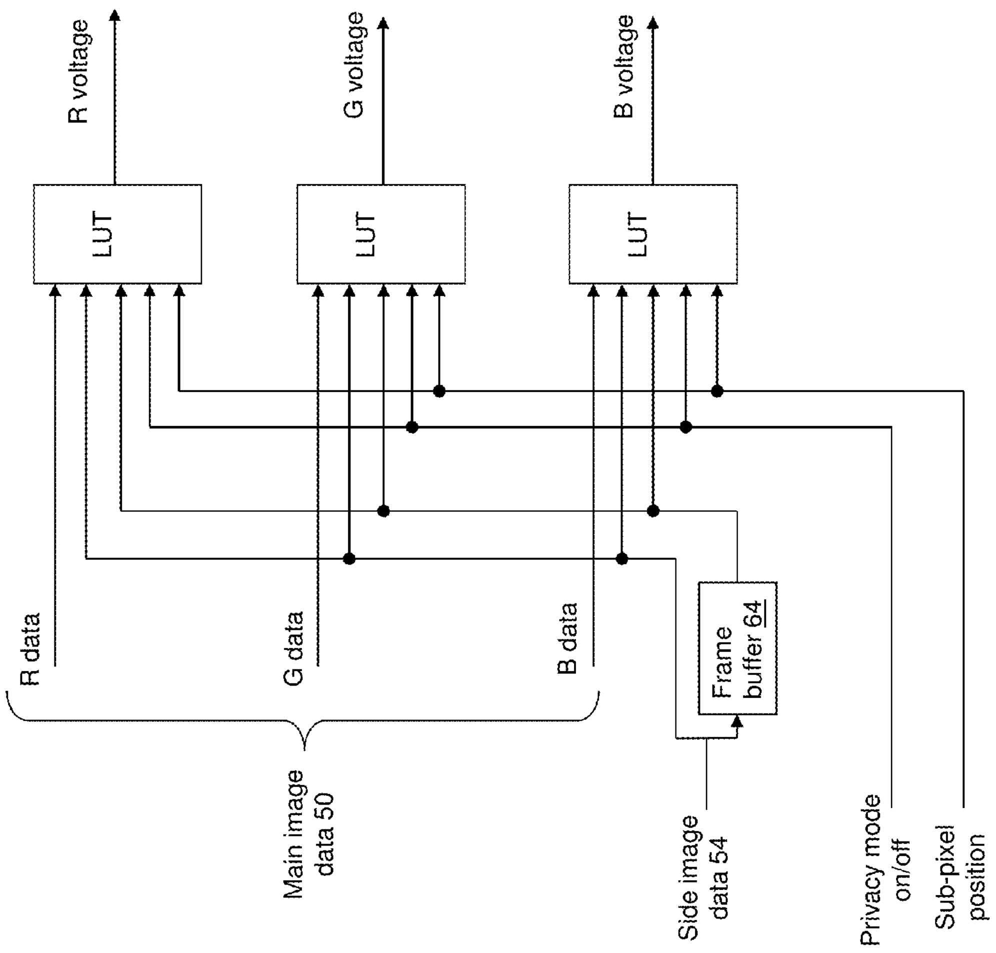
FIG. 5: is a schematic illustrating how a portion of the control electronics may be implemented in the electronic circuit in accordance with an embodiment of the invention.

The RTC scheme may be implemented by further modifying the control electronics 11. Referring to FIG. 5, a frame buffer 64 is used to compare the previous side image data 54 value with the current side image data 54 value and to choose the correct, predetermined grey level from LUTs depending on the main image pixel data 50 value, privacy on/off parameter and sub-pixel position parameter. When the LUTs determine that the previous and current side image grey levels are different, i.e., change, it outputs the predetermined compensation value which minimises or eliminates the temporal change in average brightness of the two switches 56 and 58.

Figure 6A:
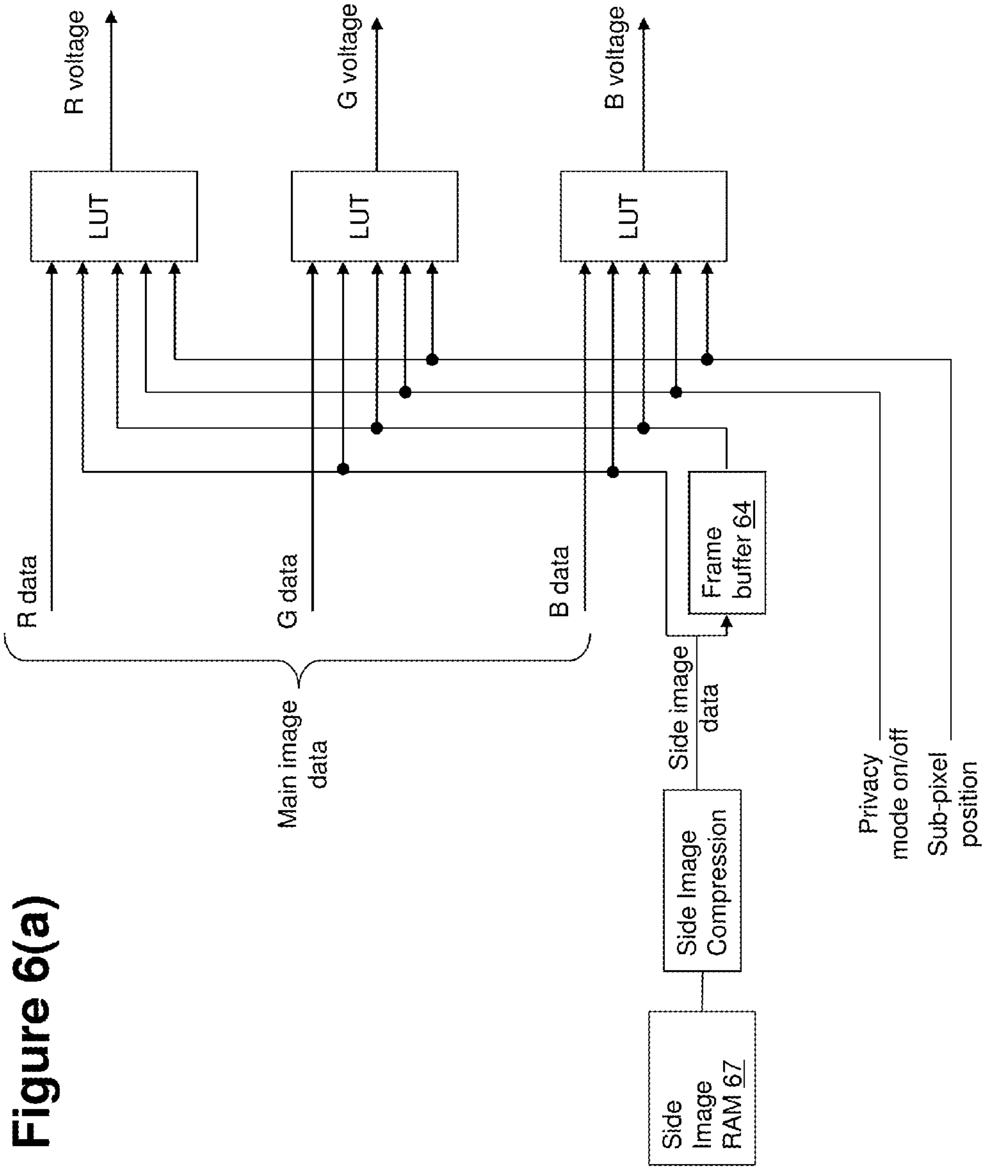
FIGS. 6(*a*) and 6(*b*): is a schematic illustrating how a portion of the control electronics may be implemented in the electronic circuit in accordance with an embodiment of the invention.
Figure 6B:
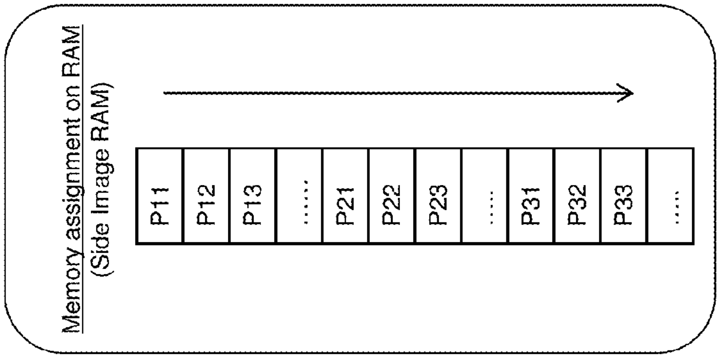

FIG. 6(*a*) shows another implementation of the above embodiment with reduced memory requirements. The side image data is compressed to reduce the bit width to fit the side image on 64 colours. The side image data is stored pixel-by-pixel in a side image data random access memory (RAM) 67, as shown in FIG. 6(*b*), where P11 is the first pixel of the first side image, P12 is the second pixel of the first side image, P21 is the first pixel of the second side image, P22 is the second pixel of the second side image, P31 is the first pixel of the third side image, P32 is the second pixel of the third side image, and so on. Each row is the size of the memory block that is read at one time. Consequently a frame buffer 64 is still required to compare the previous side image data value with the current side image data value to choose the correct, predetermined grey level from LUTs depending on the main image pixel data value, privacy on/off parameter and sub-pixel position parameter.

Figure 7B:
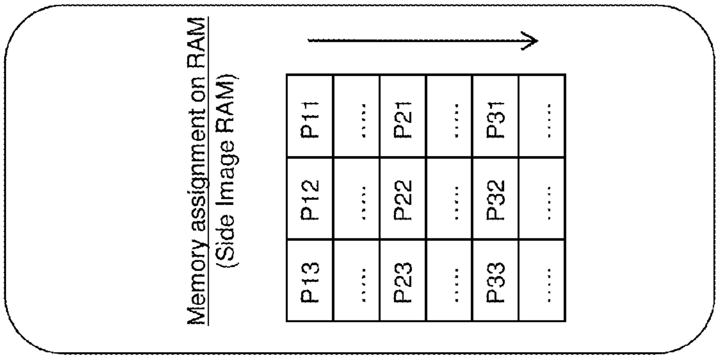
FIGS. 7(*a*) and 7(*b*): is a schematic illustrating how a portion of the control electronics may be implemented in the electronic circuit in accordance with an embodiment of the invention.
Figure 7A:
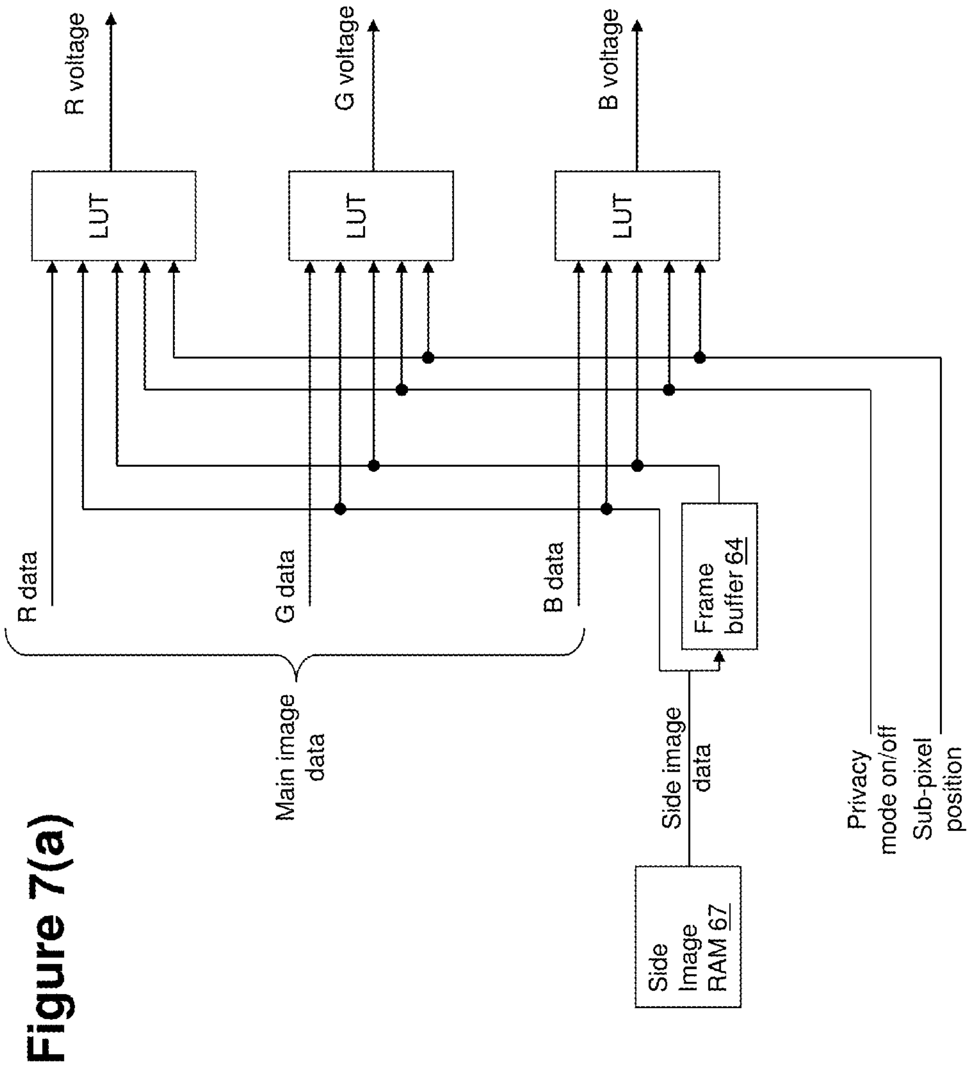

FIG. 7(*a*) is yet another implementation of the above embodiment with reduced power consumption. In this case the side image is stored in groups of several pixels, as shown in FIG. 7(*b*), and therefore has a reduced bit width. The size of the memory block read at any one time is shown by a single row in FIG. 7(*b*). The power consumption is reduced because the number of read operations are reduced. A frame buffer 64 is still required to compare the previous side image data value with the current side image data value.

The optimal compensation value may be found experimentally by first measuring the response time curve of the two luminance switches of interest. Ideally it would be preferable to speed up the slower switch; therefore one must find a compensation value for the slower transition that results in a good match in the absolute change in luminance as a function of time of the two switches. A good match is achieved when the temporal change in the average luminance of the two switches does not result in a visible on-axis flash. If a good match cannot be achieve by speeding up the slow transition, then one must find a compensation value that slows down the faster transition. If a good match in the absolute change in luminance as a function of time is not achieved the compensation value that results in the smallest temporal change in the average luminance is chosen.

For a 2 bit side image data (i.e., “side”=0, 1, 2 or 3) there are 12 possible changes in side image for each of the 256 main image data values of an 8 bit main image. A possible method used to experimentally identify the compensation values is described as follows. The change in luminance as a function of time is measured for each pair of switches 56, 58 for the 12 possible changes in side image for all main image data values. When measuring the luminance as a function of time for any given switch one should ensure that the LC is given enough time to fully switch (i.e. more than one frame may be required for the switch, therefore it may be desirable to show 10 images with the first data value and 10 images with the second data value for example). This measurement may be done using a photodiode and oscilloscope. The magnitude of the on-axis flash is also measured or calculated so as to identify the pairs of switches that require compensation. For those switches that require compensation the compensation value may be found by a trial and error process, measuring the resultant switch to see if the desired response time curve is achieved. The iterative trials are continued until a suitable compensation value is found or until it is possible to conclude that no suitable compensation value is available. Ideally the compensation value would be a value already stored in the LUTs for that particular main image value so as to minimize the amount of data stored in the LUTs. It may also be possible to use the above method to determine the compensation values only for a sub-set of main image values e.g. 32, 64, 96, 128, 160 and 224, and once these have been identified the remaining values may be interpolated.

The optimal compensation value may also be found by an automated method which measures the full set of temporal luminance changes, or a spaced sub-set of the temporal luminance changes, which include intermediate compensating frame values and then selects the pairs of transitions from the measured set which best provide optimal compensation of each other’s luminance change.

The optimal compensation values may also be found by an analytical method which uses the known equations governed LC response time to calculate predicted temporal luminance response for a range of switches and again selects from these the optimal transition pairs.

For many LCDs the temporal change in the average luminance when switching from a lower side image value to a higher side image value is greater than when switching from the same higher value to the same lower value. Consequently compensation values are often only required when switching from a lower side image value to a higher side image value. More generally, compensation values may only be necessary with respect to some changes in side image values and not with respect to other changes in side image values. Additionally, for any given main image data value, the greatest temporal change in the average luminance is general observed for the side data value 0 to side data value 3 switch. FIG. 8 is a table showing a possible RTC scheme. FIG. 8 illustrates that compensation values are required when the side image data value changes from 0 to 3, 1 to 3 and 3 to 0 and that existing side image values, already stored in the LUTs, can be used as the compensation values for 0 to 3 and 1 to 3. Consequently, for this specific case, only 1 additional set of compensation values are required; these can be stored as a single extra column in the LUTs. In FIG. 8, the sign associated with the side image value indicates whether that pixel takes the higher or lower of the two output values associated with each main image data and side image data combination. Usually, this is determined solely by the spatial position of the pixel in the image, as described above, but in the case of the intermediate compensating frame, it may depend on the values the side image is changing between, for example a pixel which normally takes the lower of the two possible output values may be made to take the brighter output value of the pair for the compensating frame in order to optimally speed up that particular transition.

Figure 9:
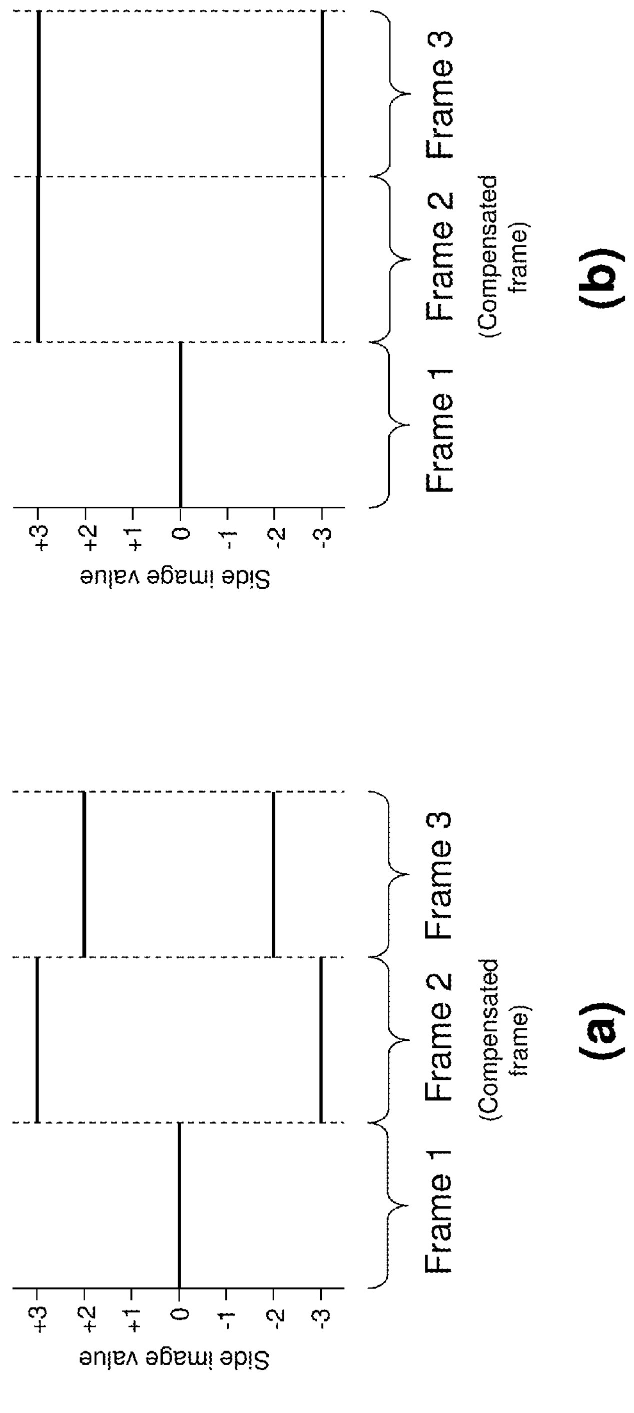
FIGS. 9(*a*) and 9(*b*): are graphs showing changing side image values with time.
Figure 10:
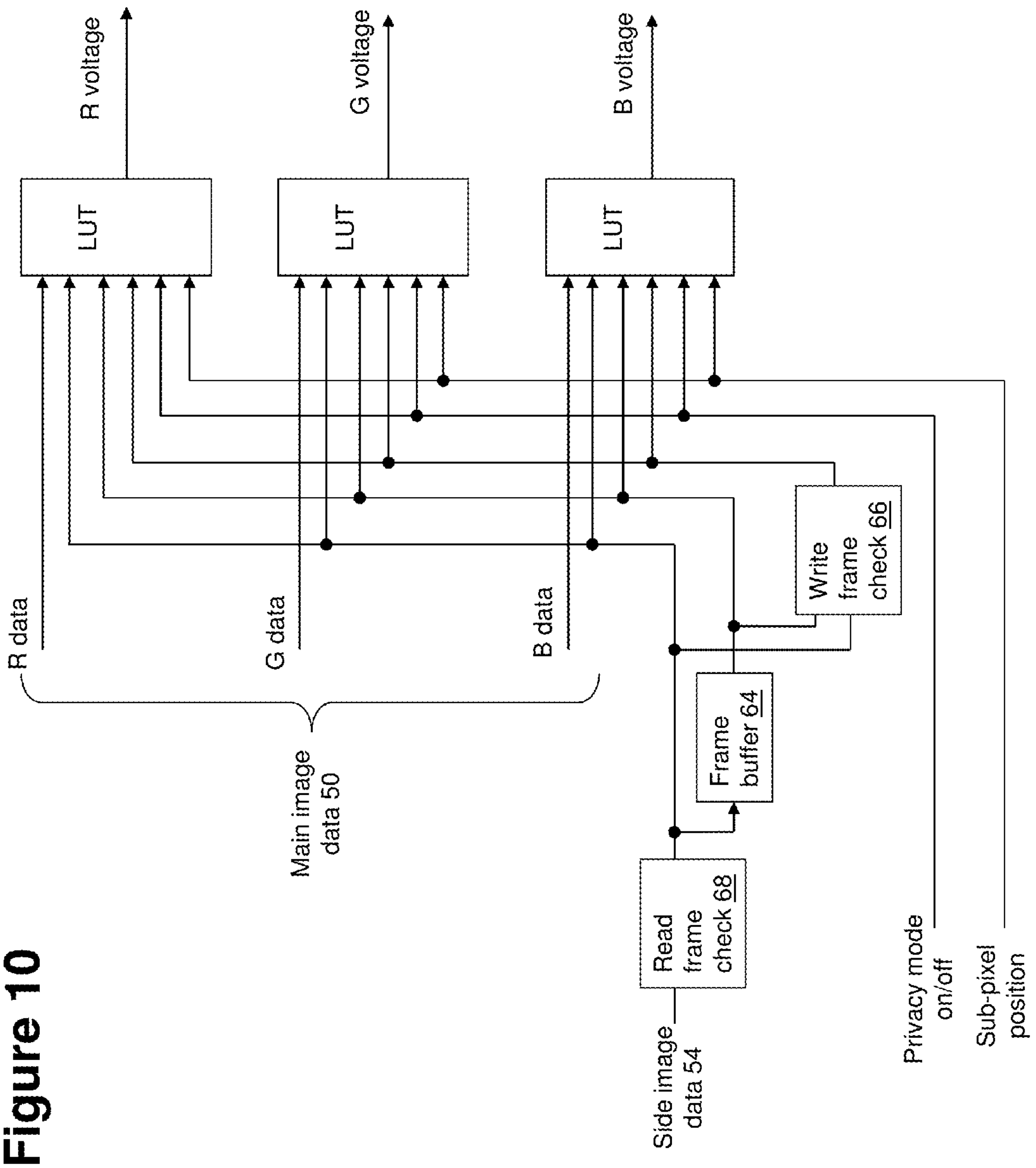
FIG. 10: is a schematic illustrating how a portion of the control electronics may be implemented in an electronic circuit according to an embodiment of the invention.

In the unusual case that the un-compensated side image data value changes every frame, for example from side 0, to side 3, to side 2, as shown in FIG. 9(*a*), the previously calculated compensation value may no longer be effective at reducing/eliminating the on-axis flash, consequently an on-axis flash artefact may be visible. The compensation value may no longer be effective as the value was calculated assuming that the side image value of the frame following the compensated frame has the same value as the un-compensated side image value of the compensated frame, as shown in FIG. 9(*b*). An additional frame check parameter may be used to solve this problem; a schematic is shown in FIG. 10. A write frame check 66 checks that the current frame side image data 54 and previous frame as provided by the frame buffer 64 have the same side image data value. If this is true the frame check parameter output by the write frame check 66 takes the value 1, if this is false the frame check parameter takes the value 0.

Figure 11:
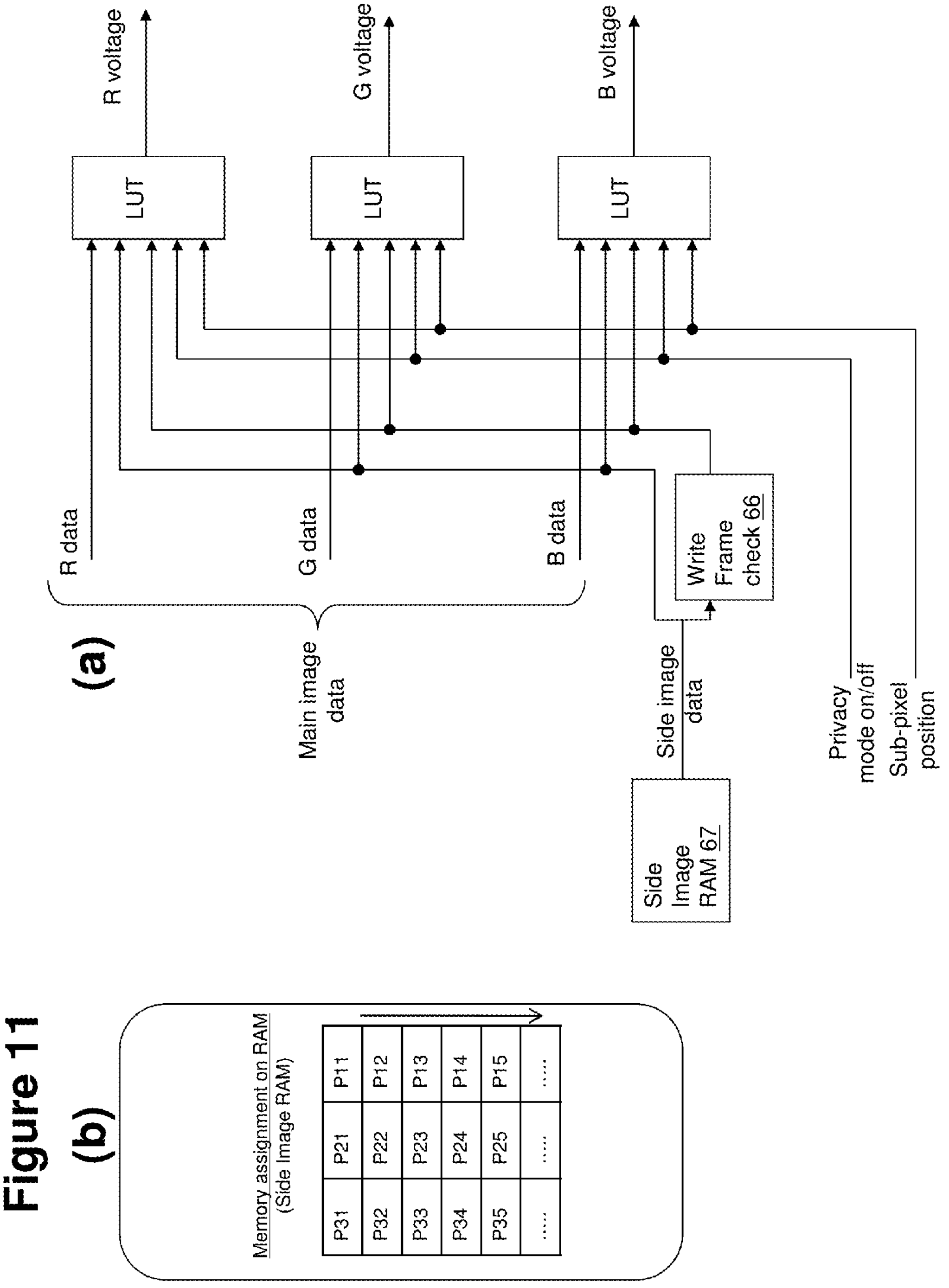
FIGS. 11(*a*) and 11(*b*): is a schematic illustrating how a portion of the control electronics may be implemented in the electronic circuit in accordance with an embodiment of the invention.

An alternative schematic to that shown in FIG. 10 is shown in FIG. 11(*a*). The schematic shown in FIG. 11(*a*) has the advantage that no frame buffer is required and therefore the circuit size is reduced. FIG. 11(*b*) shows the side image RAM memory assignment, each row represents the size of the memory block read at one time, the figure shows that it is possible to read the first pixel from the first, second and third side images at one time. This schematic allows three side image values to be compared without the need of a frame buffer.

More specifically, the write frame check 66 reads the current side image value and the previous side image value and stores a true constant if the current frame and previous frame have the same side image value and stores a false constant if the current side image value and previous side image value do not have the same side image value. For the example given in FIG. 9(*a*) a false constant is stored in the frame check parameter in frame 2. The frame check parameter is read by a read frame check 68 before it is rewritten in frame 3. If the frame check parameter holds a false constant the side image value is altered to take the same value as the previous frame. This ensures that the compensation values act as expected and reduce/eliminate the on-axis flash artefact, at the expense of not displaying side image features which are only present for a single frame. The side image as a whole may still be updated at the full frame rate; it is only single frame transient features which are removed. The frame check parameter could also be configured to only return a false value if the side image is changing in two consecutive frames between values which require compensation values to be inserted. In this way, the side image is allowed to change everywhere at the full frame rate between values which do not require compensation.

Another solution to the above problem would be to halve the frame rate of the side image however this is less desirable.

The various components of the control electronics described herein may be implemented via hardware, software, firmware, or any combination thereof as will be appreciated.

The present invention as described herein has been primarily in the context of a display with a public mode and private mode. However, the present invention may be used in any context in which the display perceived by an off-axis viewer is intended to be different from a display perceived by an on-axis viewer. For example, the present invention may be incorporated within a display with a dual-view or multi-view display mode in which the on-axis viewer perceives a main image and an off-axis viewer perceives a secondary image.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

A high quality LCD display is provided which has public and private mode capability, in which no modifications to the LC layer or pixel electrode geometry is required from a standard display, has a substantially unaltered display performance (brightness, contrast ratio, resolution, etc.) in the public mode and, in the private mode has a strong privacy effect with minimal degradation to the on-axis image quality, particularly for a changing side image. Performance of the LCD display is improved over conventional displays with public and private modes without significant increase in cost or complexity.

The invention claimed is:

1. A display device, comprising:

a liquid crystal display panel including a plurality of pixels each having one or more sub-pixels; and control electronics configured to provide, in response to image data, signal voltages to the pixels in a first mode whereby an on-axis viewer and an off-axis viewer perceive substantially a same main image, and signal voltages to the pixels in a second mode whereby the on-axis viewer perceives the main image and the off-axis viewer perceives a side image different from the main image;

wherein in the first mode the signal voltages provided to the pixels result in a luminance among a group of the sub-pixels, and in the second mode the signal voltages provided to the pixels result in the luminance redistributed among the group of sub-pixels, an average luminance among the group of sub-pixels in the second mode being substantially proportional to an average luminance among the group of sub-pixels in the first mode with respect to the on-axis viewer, regardless of a degree of redistribution, and substantially varying with the degree of redistribution with respect to the off-axis viewer, and the control electronics is further configured to compensate for a temporal change in the average luminance among the sub-pixel pairs in the second mode due to a difference in electro-optical response of the sub-pixels within the group of sub-pixels as a result of a change in the degree of luminance redistribution, by adding a compensation value to the signal voltages to underdrive or overdrive one or more of the sub-pixels within the group of sub-pixels.

2. The display device according to claim 1, wherein the signal voltages provided to the pixels in the second mode are based on main image data and side image data received by the control electronics, the degree of luminance redistribution is a function of the side image data, and the compensation value is provided in response to a change in value of the side image data.

3. The display device according to claim 2, wherein the compensation value is predetermined to avoid a visible on-axis flash.

4. The display device according to claim 2, wherein the control electronics is configured to add the compensation value to the signal voltages in response to some predefined changes in value of the side image data and not in response to other predefined changes in value of the side image data.

5. The display device according to claim 1, wherein as a result of the change in degree of the luminance redistribution a first one of the sub-pixels in the group of sub-pixels has a relatively fast electro-optical response and a second one of the sub-pixels in the group of sub-pixels has a relatively slow electro-optical response, and wherein the control electronics provides the compensation value to slow the electro-optical response of the first one of the sub-pixels and/or speed up the electro-optical response of the second one of the sub-pixels.

6. The display device according to claim 1, wherein the side image is a mask to obscure and/or degrade the main image.

7. The display device according to 1, wherein the control electronics in the second mode maps data values of the main image data and side image data to a single signal voltage per pixel, and when the control electronics determines a change in a current side image data value compared to a previous side image data value the control electronics adds the compensation value to the signal voltage.

8. The display device according to claim 7, wherein the control electronics includes at least one look-up table for mapping the data values of the main image data and the side image data, the at least one look-up table including compensation values corresponding to different changes in the current side image data value and previous side image data value.

9. The display device according to claim 1, the control electronics being further configured to avoid providing compensation values to a sub-pixel in consecutive frames.

10. The display device according to claim 7, wherein the side image data is stored in a side image data random access memory (RAM) included in the control electronics.

11. The display device according to claim 10, wherein the RAM stores the side image data pixel-by-pixel, and the control electronics reads the side image data for a given pixel from the RAM one side image at a time.

12. The display device according to claim 10, wherein the side image data is stored in the RAM in groups of several pixels, and the control electronics reads the side image data for multiple pixels of a given side image from the RAM at a time.

13. The display device according to claim 10, wherein the side image data is stored in the RAM in groups of several pixels, and the control electronics reads the side image data for a given pixel for multiple side images from the RAM at a time.

* * * * *